Aug. 28, 1945.     J. W. IRBY     2,383,485
PARACHUTE RELEASE
Filed Aug. 18, 1944

INVENTOR.
JAMES W. IRBY
BY William D. Hall
ATTORNEY

Patented Aug. 28, 1945

2,383,485

UNITED STATES PATENT OFFICE 2,383,485

PARACHUTE RELEASE

James W. Irby, Dayton, Ohio

Application August 18, 1944, Serial No. 550,120

3 Claims. (Cl. 294—83)

(Granted under the act of March 3, 1883, as amended April 30, 1928; 370 O. G. 757)

The invention described herein may be manufactured and used by or for the Government for governmental purposes, without the payment to me of any royalty thereon.

The invention to be hereinafter described relates to an automatic parachute release sister hook.

It has long been common practice to drop loads of many types by parachute. A great proportion of such deliveries are on water. A serious problem when dropping by parachute on water is to avoid fouling by the parachute. That has been one of a number of reasons for devising means for releasing the parachute from the load as the load lands, so that the parachute may drift free, thereby removing the most prolific source of fouling. Known automatic release devices of the sister hook type are complicated, large, heavy, cumbersome, costly and not always entirely reliable.

The main objects of the present invention are to overcome the above and other objections and provide a simple, compact, light weight, efficient and low cost device capable of quantity production and always thoroughly reliable in operation.

In order to more clearly disclose the construction, operation and use of the invention, reference should be had to the accompanying drawing forming part of the present application.

Throughout the several figures of the drawing, like reference characters designate the same parts in the different views.

Figure 1:
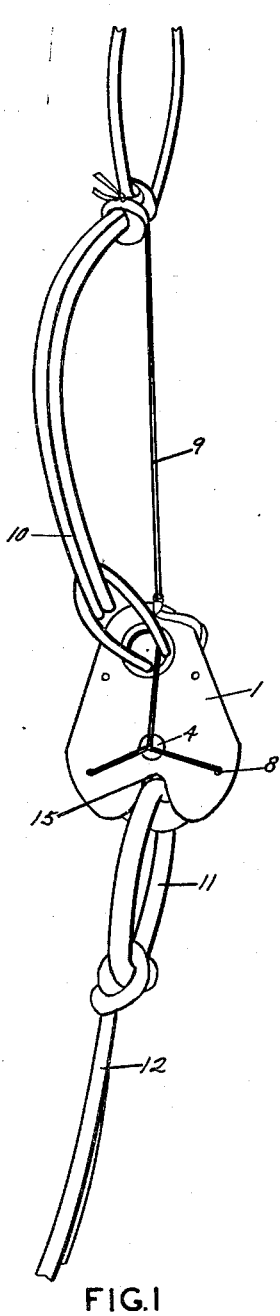
Fig. 1 is a side elevation of the invention, applied, with static cord intact.
Figure 2:
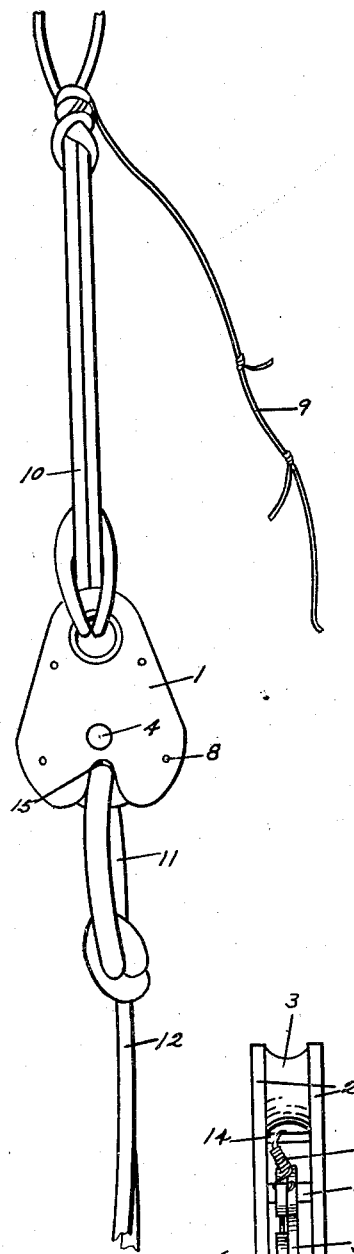
Fig. 2 is a like view with static cord severed.
Figure 3:
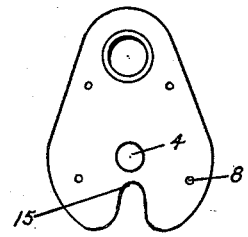
Fig. 3 is a side elevation with hook in inoperative or load discharging position.

Automatic load release from a suspending means by relieving the load stress or strain is, in general, well understood and, therefore, requires no detailed showing or description in this application.

In the present invention the construction and operation will be referred to in its use with parachute delivery, a sister hook being interposed between the load and the parachute.

The sister hook comprises a block or body 1 either of a single casting comprising two parallel plates or faces 2 spaced by a short tubular neck or eye 3, or of separate parts suitably connected. As shown in the drawing, it is of pear or egg shape in general outline, though that is not essential. However, such outline is conducive to simplicity, compactness and ready disposition of the device in its connecting load lines. That shape, accordingly, is the preferred shape.

Figure 4:
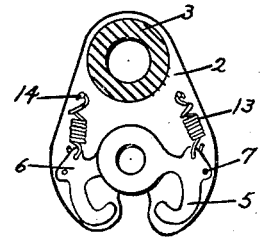
Fig. 4 is a view similar to Fig. 3 with near plate of casting removed.
Figure 5:
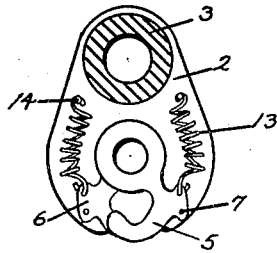
Fig. 5 is a view similar to Fig. 4 with hook in operative or load holding position.
Figure 7:
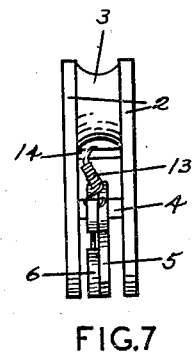
Fig. 7 is an edge view of Fig. 2, enlarged.
Figure 6:
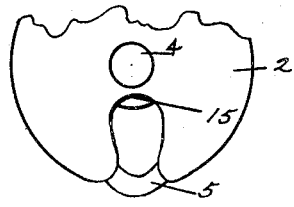
Fig. 6 is an enlarged fragmentary side elevation (of the lower part) showing the hook in operative or holding position.

About midway of the greatest lateral diameter of the assembled plates and in the longitudinal axis of the plates, aligned with the center of neck 3 is disposed the pivot pin 4. Pivoted on pin 4 are two cooperating hooks 5 of the sister hook assembly, each provided with a wing 6 having a small perforation 7 adapted to be aligned with a similar perforation 8 through the lower part of the respective plate or face 2. When the hook elements are in operative position, as in Fig. 1, static cord 9 passed through holes 7 and 8 and tied to wings 6 will, under stress up to its breaking point, maintain operative position of the hook members. Operative stress or strain of static cord 9 is maintained by connecting its upper end to the parachute line 10 above the block in such manner as to take the weight of the block and connected load from the parachute cord and sustain it by the static cord up to the breaking point of 9. With the parts in such operative position, the ring 11 of the load line 12 is seated in the hooks 5. The hooks 5 are so formed or curved that in operative position, as in Figs. 1 and 5, each blocks or closes the throat of the other or provides a mousing for it. Left to gravity, alone, hook members 5 would assume a position approximately operative. But they are not left free to gravitate. Instead, a coil retracting spring 13 is provided for each. One end of each spring is connected to a pin 14 considerably above the pivot 4 and laterally outward therefrom toward the block edge. The opposite end of each spring 13 is connected to the respective wing 6. Springs 13, therefore, keep hook elements 5 swung back to open, load releasing or inoperative position, as in Fig. 4, at all times that they are free to be moved to such position.

While coil springs 13 are ample to swing hook members 5 to open inoperative or load releasing position, they are not strong enough to overcome an appreciable load on those members. So with ring 11 seated in members 5 and a load exerted on 11 through 12 the members 5 will be maintained in operative position by the load weight against the retracting action of springs 13, after the static cord 9 has been ruptured by imposition of the load on it after launching of the parachute and load. However, as soon as the load is removed from ring 11 the spring will retract hook members 5 releasing ring 11 and dropping the load. Obviously, landing of the load either on water or land removes the load and the hook members are then retracted and the parachute is disconnected so that it drifts free and avoids fouling.

It is hardly necessary to state that plates 2 are recessed, notched or cut away, as at 15, to pass the ring 11 in between the retracted hook members 5 so that it may be held there seated in them.

In operation, static cord 9, connected to wings 6, is connected to parachute line 10 under tension with slack in line 10 between that connection and block 1. The end of parachute line 10 is connected to block 1 through the eye or tubular neck 3, as clearly shown. Ring 11 of the load line 12 is then slipped into notch 15 between the retracted hook members 5. Next, static cord 9 is pulled to close members 5 to seat ring 11. Then the load is put on load line 12, holding the hook members 5 in operative position. These steps are preliminary to launching the parachute with its load. As the load is launched, weight on block 1 strains static cord 9 to rupture point, freeing hook members 5 to retraction by springs 13 when load on ring 11 is removed. As the static cord breaks, the slack in the parachute line 10 is taken up. The load on line 12 maintains operative position of hook members 5 until the load is relieved. As it is relieved, springs 13 retract hook members from operative position, ring 11 is dropped and the parachute is released, so that it drifts free and danger of fouling is eliminated. The load is relieved, of course, as it lands, either on land or on water.

It is believed that the construction, operation and use of the invention will be clear from the preceding detailed description.

Changes may be made in the construction, arrangement and disposition of the various parts of the invention, within the scope of the appended claims without departing from the field of the invention and it is meant to include all such within this application wherein only one preferred form of the invention has been illustrated purely by way of example and with no thought or intention of, in any degree, limiting the invention thereby.

Having thus described my invention, what I claim and desire to protect by Letters Patent is:

1. In combination in a device of the character described an approximately oval block having an axially disposed load ring receiving notch in its larger end and provided with openings spaced at opposite sides of said notch for passage of a static cord, a parachute cord receiving eye extending through the small end of said block and axially aligned with said notch, a pair of sister hooks concentrically pivoted along the longitudinal axis of said block within said block and, in operative position, bridging the aforesaid notch, each of said hooks being provided with a wing having perforations for connecting elements thereto, a retracting spring for each hook mounted in said block and connected at its opposite ends, respectively, to said block and to the wing of the particular hook and a static cord extended through the aforesaid spaced openings in said block and connected to said wings and under stress acting to maintain said hooks in operative position.

2. In combination in a device of the character described an elongated block having an axially disposed load ring receiving notch in one end, a pair of sister hooks concentrically pivoted along the longitudinal axis of said block within said block and, in operative position, bridging the aforesaid notch and a retracting spring for each hook mounted in said block and connected at its opposite ends, respectively, to said block and to the particular hook.

3. In combination in a device of the character described an elongated block having an axially disposed load ring receiving notch in one end, a pair of sister hooks concentrically pivoted along the longitudinal axis of said block within said block and, in operative position, bridging the aforesaid notch, a retracting spring for each hook mounted in said block and connected at its opposite ends, respectively, to said block and to the particular hook and means severable by a predetermined stress for maintaining said hooks in operative position.

JAMES W. IRBY.